United States Patent
Segura de Luna

[11] Patent Number: 5,915,704
[45] Date of Patent: Jun. 29, 1999

[54] SUPERMARKET SHOPPING CARTS

[75] Inventor: Gerardo Segura de Luna, Barcelona, Spain

[73] Assignee: Policad Industrial, S.L., Barcelona, Spain

[21] Appl. No.: 08/773,177

[22] Filed: Dec. 27, 1996

[30] Foreign Application Priority Data

Dec. 29, 1995 [ES] Spain ................................. 9503310

[51] Int. Cl.⁶ .............................. B62D 39/00; G09F 3/10
[52] U.S. Cl. ........................ 280/33.991; 280/33.991; 280/33.997; 40/308
[58] Field of Search ................. 280/33.991, 33.992, 280/33.996, 33.997, 33.998; 40/308

[56] References Cited

U.S. PATENT DOCUMENTS

| | | | |
|---|---|---|---|
| 2,890,057 | 6/1959 | Davis | 280/33.993 |
| 3,717,358 | 2/1973 | Mills | 280/33.99 R |
| 3,813,111 | 5/1974 | Ruger | 280/33.991 |
| 3,844,577 | 10/1974 | Wahl | 280/33.99 R |
| 4,046,394 | 9/1977 | Thompson, Jr. | 280/33.993 |
| 4,544,171 | 10/1985 | Kellogg | 280/33.992 |
| 4,632,411 | 12/1986 | Badger | 280/33.99 R |
| 4,746,134 | 5/1988 | Rehrig | 280/33.991 |
| 5,158,310 | 10/1992 | Tannehill et al. | 280/33.992 |
| 5,210,968 | 5/1993 | Rehrig | 280/33.992 |
| 5,255,930 | 10/1993 | Jones et al. | 280/33.992 |
| 5,280,932 | 1/1994 | Folsom | 280/33.992 |
| 5,505,472 | 4/1996 | Trubiano | 280/33.993 |
| 5,613,696 | 3/1997 | De Luna | 280/33.991 |

FOREIGN PATENT DOCUMENTS

| | | |
|---|---|---|
| 0222480 | 5/1987 | European Pat. Off. . |
| 2537214 | 3/1977 | Germany . |
| 8530050 | 1/1986 | Germany . |
| 2181097 | 4/1987 | United Kingdom . |
| 93/02903 | 2/1993 | WIPO . |

*Primary Examiner*—Robert J. Oberleitner
*Assistant Examiner*—Lynda Jasmin
*Attorney, Agent, or Firm*—Nath & Associates; Gary M. Nath; Harold L. Novick

[57] ABSTRACT

A single-piece plastic body supermarket cart having a load basket and a base into which support wheels are mounted. The basket has a swinging rear wall. Between the swinging rear wall and the side walls are holes covered by corresponding plates that can be pushed against the side walls. These plates are positioned so that they are automatically in the closed position over the holes. The swinging wall has a built-in child seat formed by two plates. A back plate having side wings in combination with grooves located in the side walls serve as stops. The base is provided with a rear extension, where the rear wheels of the cart are mounted. Each wheel is attached by being fastened in a hole in the base.

6 Claims, 9 Drawing Sheets

SUPERMARKET SHOPPING CARTS

BACKGROUND OF THE INVENTION

Field of the Invention

The present invention is drawn to folding supermarket shopping carts.

In supermarkets and similar establishments, carts are usually put at the disposal of the customers in order to facilitate collection and transportation of the products to be purchased.

Such carts have usually been manufactured as metal structures, consisting of welded bars and rods. This solution has recently been improved by means of plastic constructions.

The present invention concerns a supermarket cart of the plastic type. The rear wall of the carrying basket of these carts is on an assembly that permits it to swing from a joint at the top, thus allowing the insertion of one cart inside another while they are parked, so that the carts will take up a minimum amount of space.

The carrying basket of these carts requires a configuration that narrows toward the front, to make it possible to insert the carts into each other. It is therefore necessary for the width of the rear swinging wall to decrease toward the bottom. Due to the narrowing of the swinging back wall, openings are left at the bottom between the edges of said wall and the side walls of the basket through which objects from the load carried on the inside can fall.

In order to avoid these openings, a solution based on parts at right angles is known, as described in U.S. patent application Ser. No. 08/358,372 of the applicant.

Moreover, a seat for small children is often incorporated in the above-mentioned swinging rear wall of the cart basket, formed by two plates that form a folding and unfolding set which determine said seat. In known realizations, these seats are not very sturdy due to the fact that maintenance of the unfolded position is achieved solely by holding the top of the two parts that make up the seat.

In other matters, we find that there have been several attempts to place advertising on these carts, but none of these attempts has given a satisfactory final result.

In fact, in the case of metal carts, it is not possible to hang advertisements outside the side walls of the basket because it prevents one basket from being inserted into another, when one cart is placed behind another in storage.

Advertisements must then be placed solely at the front of the basket in these metal carts, which is insufficient, and therefore this solution has not been accepted.

In the case of plastic carts, the advertising signs are superimposed on the sides of the baskets, affixed by any adequate means. The arrangement overhangs said walls, creating the possibility of hang-ups when the carts are handled and friction when the carts are inserted into each other, which causes the advertising panels to deteriorate rapidly; as a result, this solution has not been duly accepted either.

SUMMARY OF THE INVENTION

In accordance with the present invention, a new cart of the type indicated is proposed that has been developed according to a realization with very advantageous constructive and functional characteristics, effectively solving all the problems and inconveniences mentioned in currently known carts of this type.

This cart, which is the object of the invention, consists of a single plastic piece that forms the load basket and the support base to which the support wheels are attached. The basket also has a swinging rear wall and is characterized by including, at the bottom, between said swinging back wall and the side walls, plates that close the holes in the bottom between said swinging wall and the side walls. These plates are set in a hinged mounting that allows them to fold against the side walls to allow insertion of the carts, but they tend to close over said holes automatically.

In this cart, which is the object of the invention, the walls around the basket are furthermore made with outwardly protruding ribs. Due to these ribs, the walls of the basket acquire the necessary durability. The inside surface is completely flat, while the outside has areas for placing advertising signs in a protected arrangement that is not impacted when the cart is inserted into the basket of another cart.

The tops of the basket side walls have been provided with two inward-facing, step shaped grooves in which are set the side wings of the back of the child seat, thus creating stops that keep the back of the child seat stable when the same is in use position.

The support base of the cart is provided with a rear extension that extends beyond the vertical plane of the back of the basket. The rear support wheels are placed in this extension, producing a configuration that reduces the probability of the cart overturning toward the rear.

The cart support wheels are attached by means of a device for compressing a small elastic sleeve which remains compressed when expanded, allowing for rapid and safe assembly of these wheels to the base of the cart, as well as easy disassembly.

For all the above reasons, this cart, which is the object of the invention, has highly advantageous characteristics as compared to known carts of the same type.

DETAILED DESCRIPTION

Figure 1:
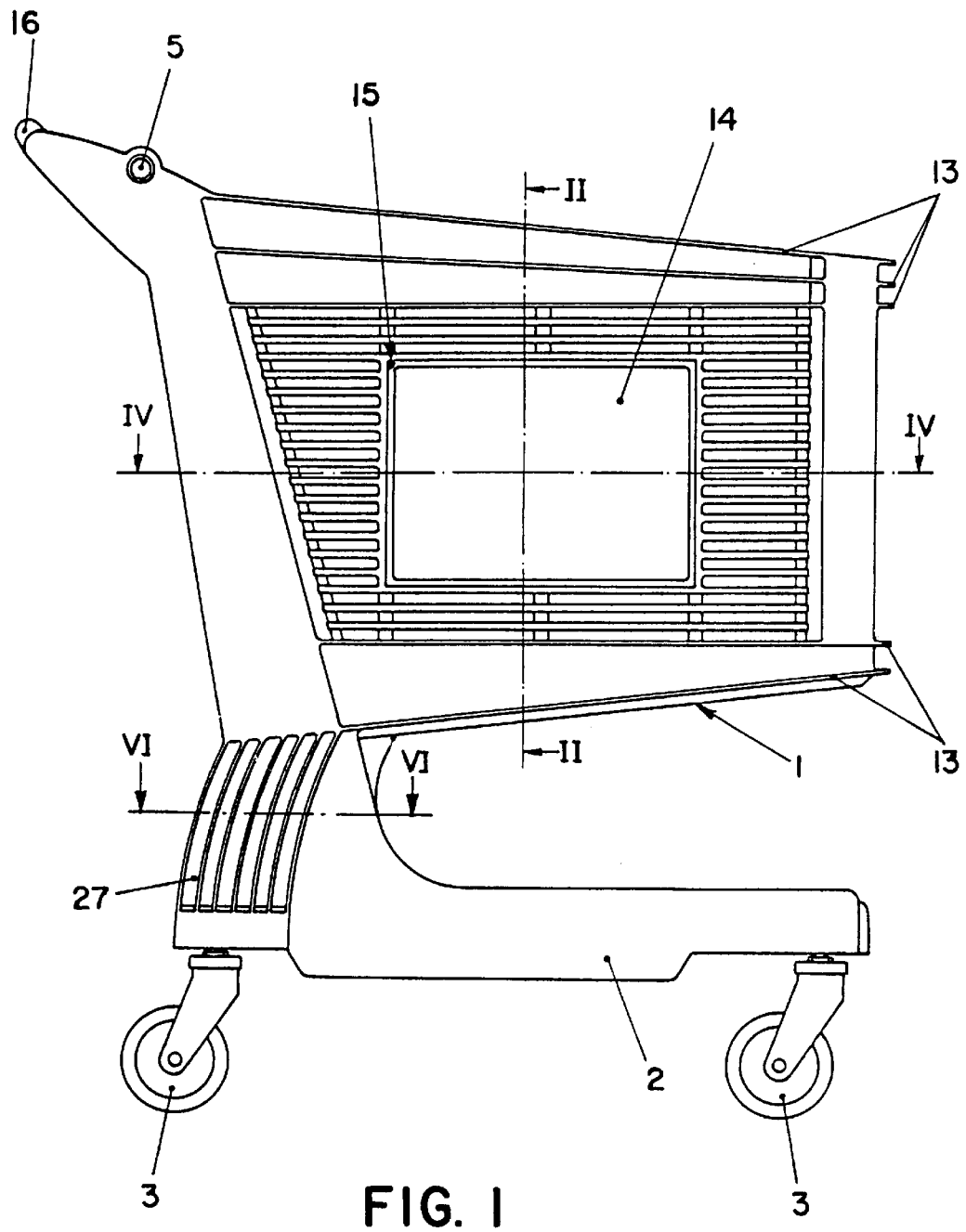
FIG. 1 shows a side elevation view of the cart that is the object of the present invention.
Figure 2:
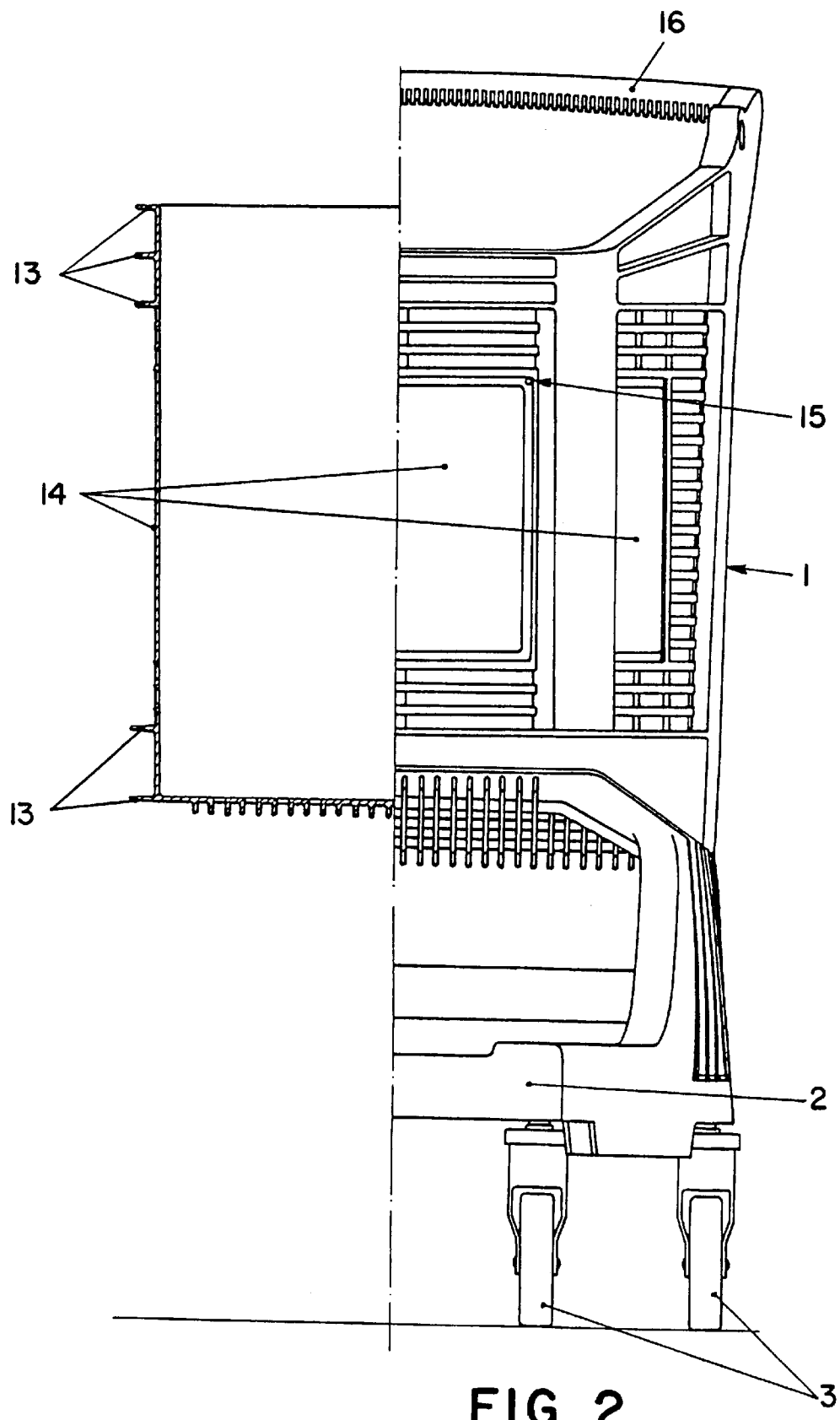
FIG. 2 is a front view of the cart, with one half sectioned along the direction II—II indicated in the previous Figure.
Figure 3:
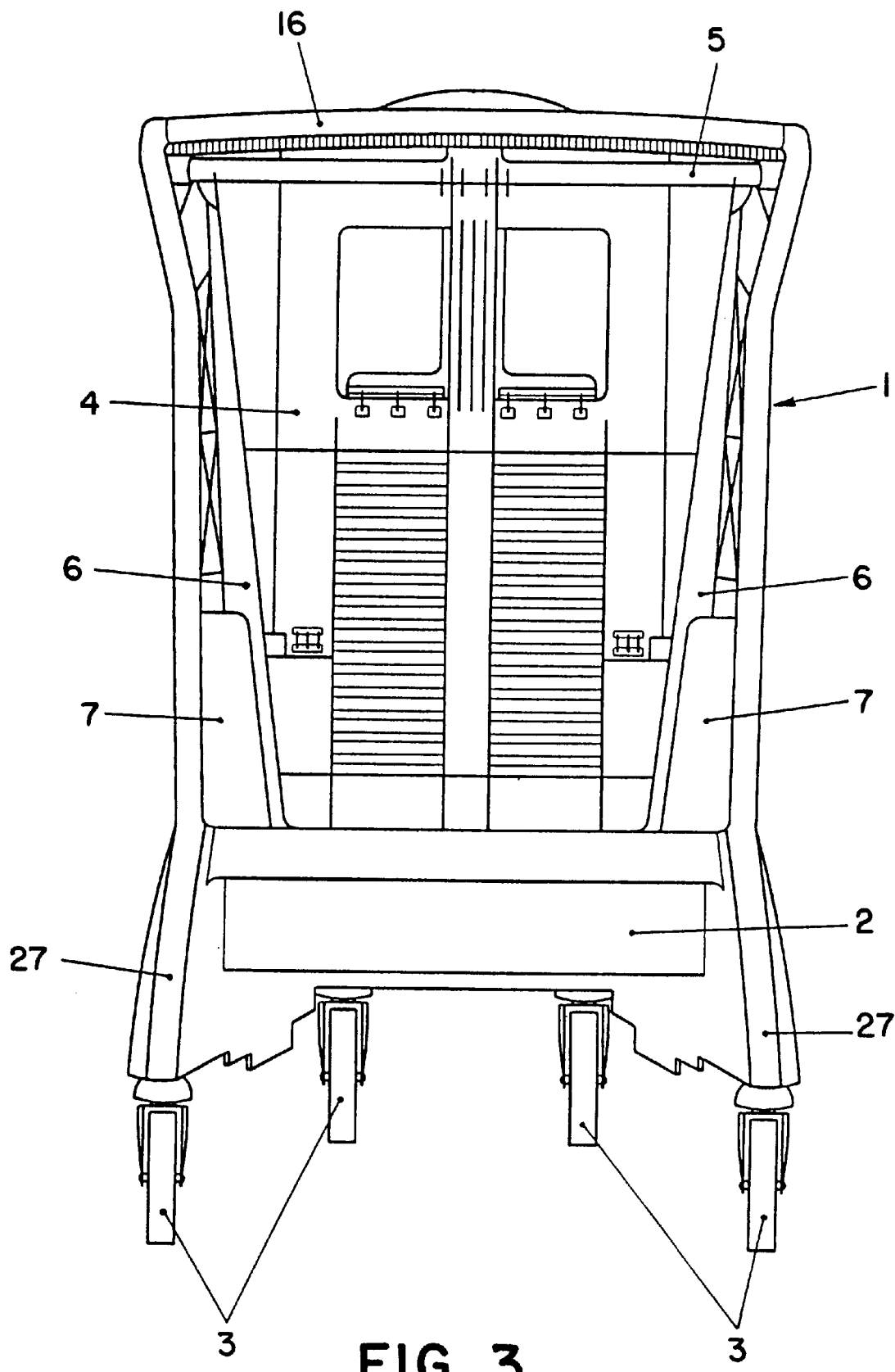
FIG. 3 is a rear view of the cart.
Figure 4:
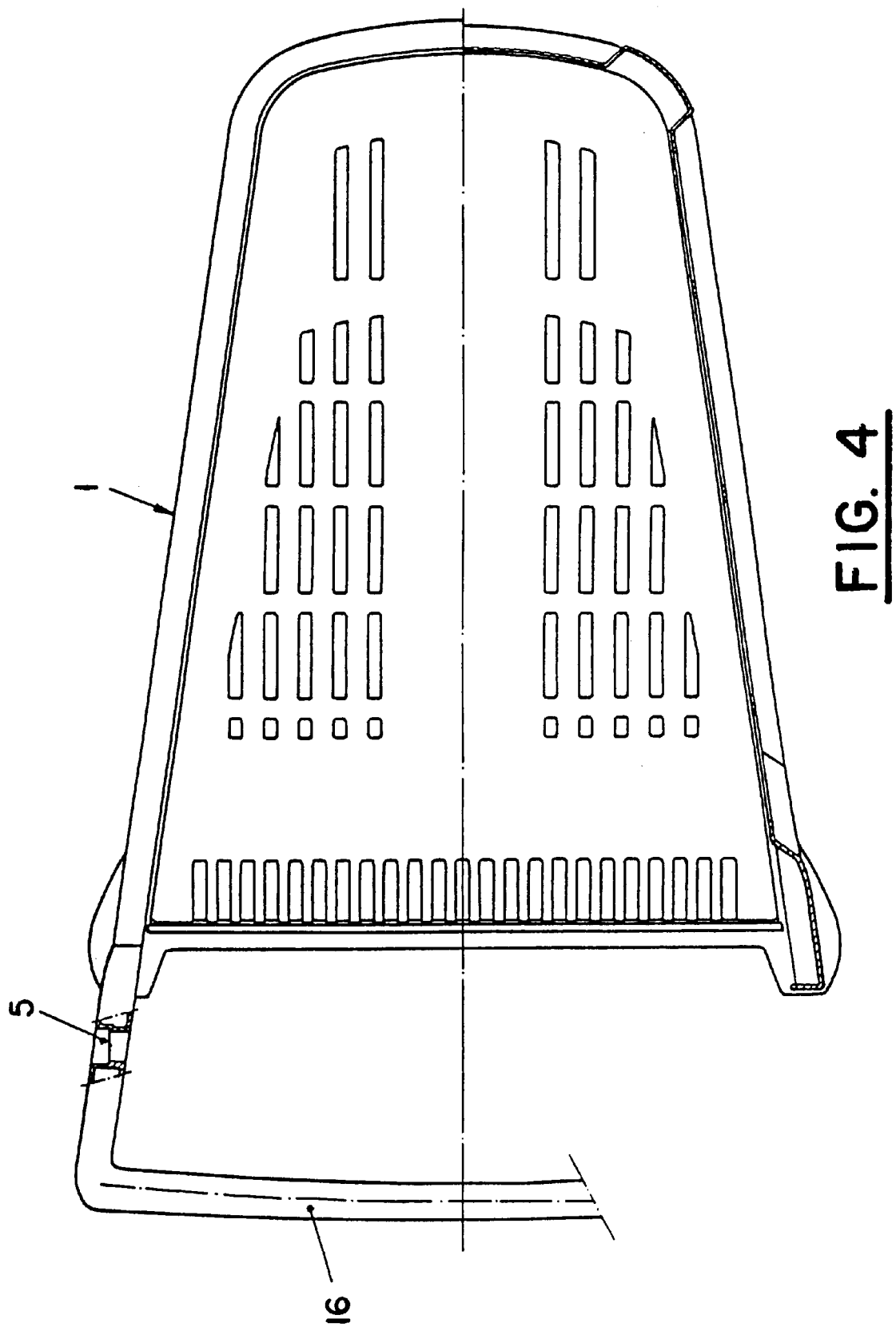
FIG. 4 is a top view of the cart, sectioned through the middle along the direction IV—IV in FIG. 1.
Figure 5:
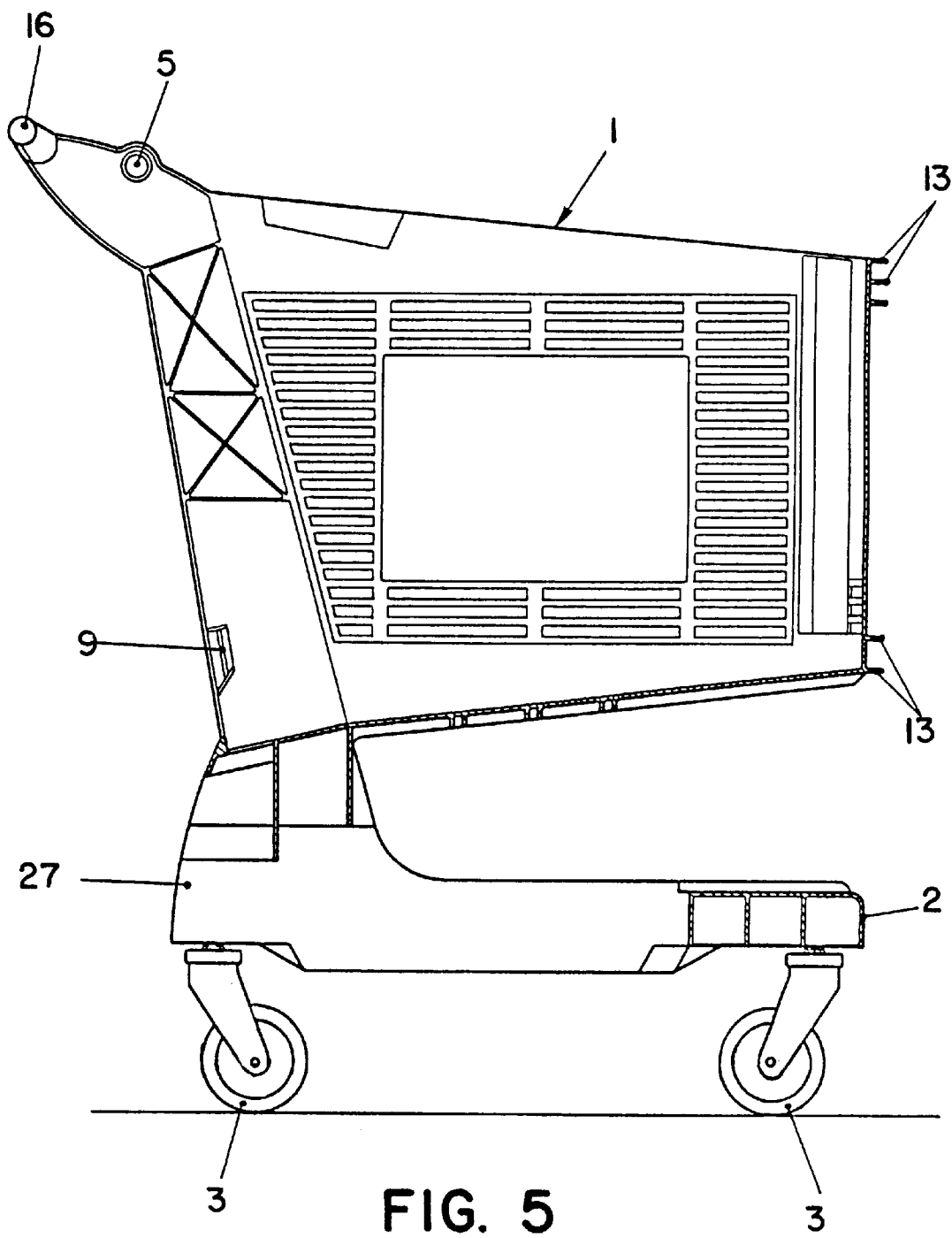
FIG. 5 is a sectioned side view of the cart, without the basket rear swinging wall.
Figure 6:
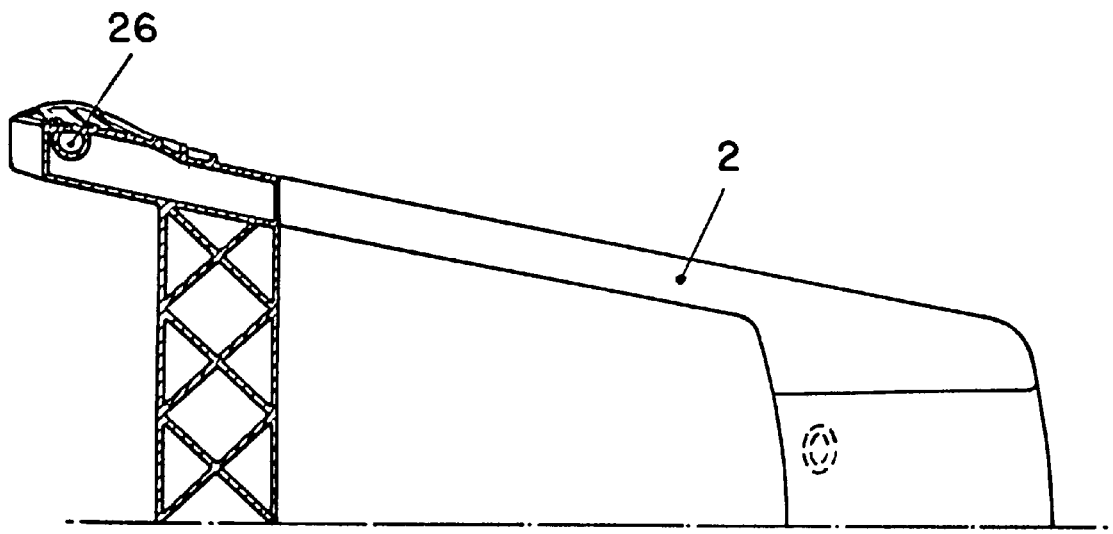
FIG. 6 represents a half view of the top of the cart base, coinciding with the plane of section VI—VI, indicated on FIG. 1.
Figure 7:
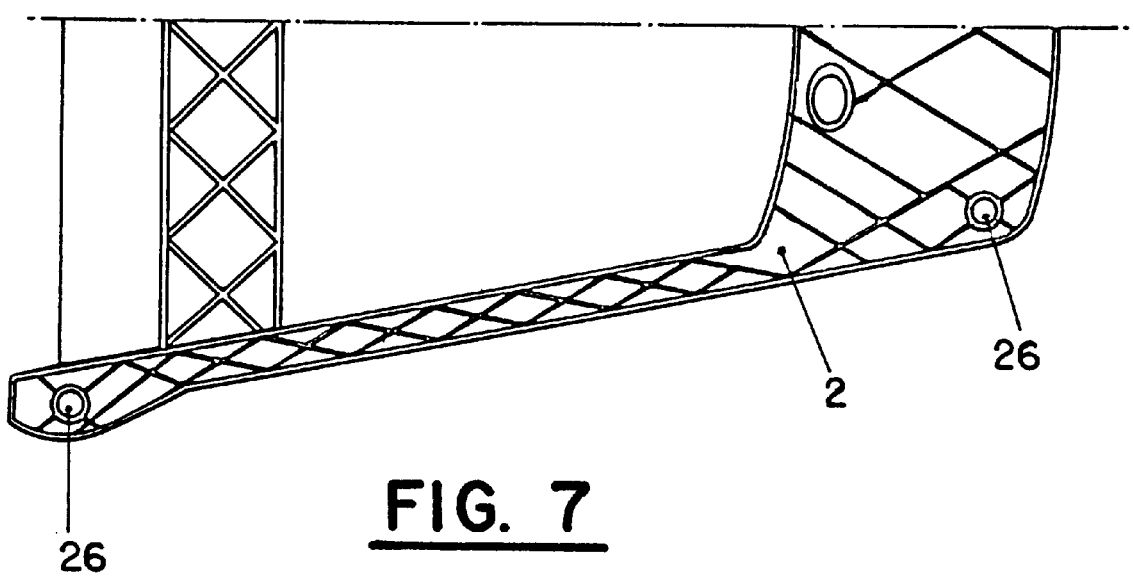
FIG. 7 is a half view of the bottom of the cart base.
Figure 8:
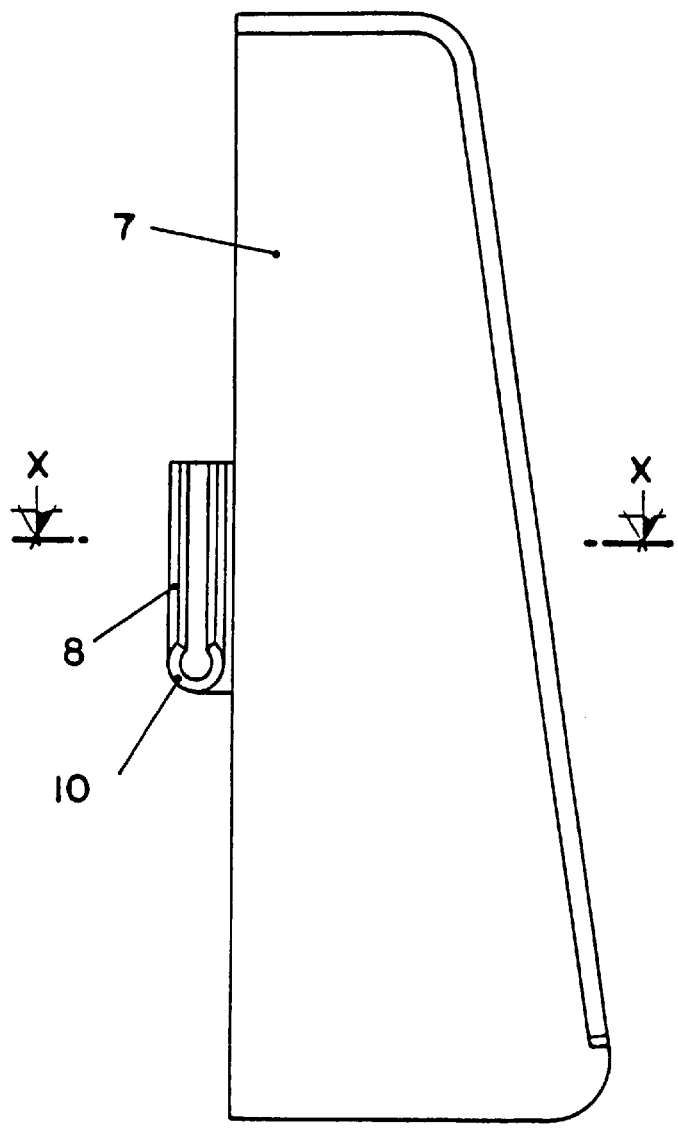
FIG. 8 is an enlarged front view of one of the plates used to cover the holes in the bottom between the rear swinging wall and the side walls of the cart basket.
Figure 9:
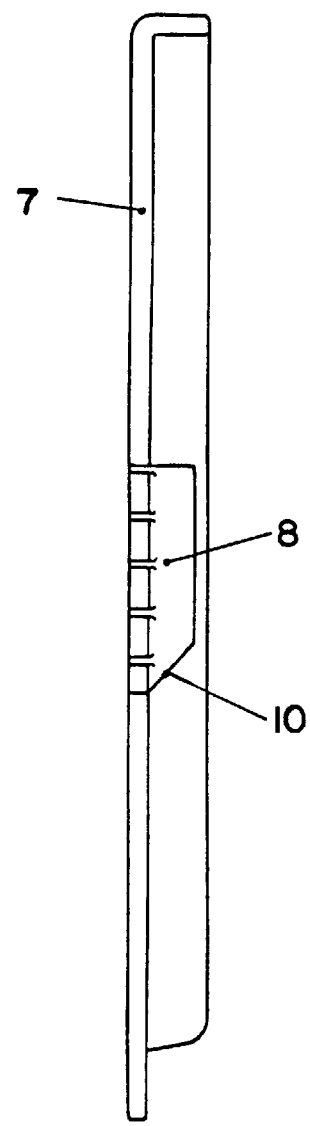
FIG. 9 is a side view of the plate depicted in FIG. 8.
Figure 10:
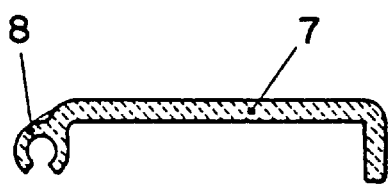
FIG. 10 is a view corresponding to plane X—X indicated in FIG. 8.

The object of the invention is a cart of the type made available in supermarkets and similar establishments. According to the present invention, this cart consists of a single plastic part, which includes the load basket (1) and a carrying base (2) to which the corresponding support wheels (3) are attached allowing for movement of the cart.

As in conventional carts of this type, the load basket (1) consists of a back wall (4) that swings from a joint at the top (5), thus allowing the insertion of carts into each other when they are parked. For this purpose, basket (1) also has a form that narrows toward the front to make the above-mentioned insertion of the carts possible.

This configuration of basket (1) forces swinging back wall (4) to narrow toward the bottom, so that its shape along its width will allow it to swing into the basket (1) when the basket (1) of one cart is inserted into the basket (1) of another.

This leaves holes (6) at the bottom between said swinging rear wall (4) and the side walls of the basket (1), through which products from the load carried inside the basket (1) can fall.

In order to solve this problem, the cart that is the object of the present invention is fitted with plates (7) that coincide at a certain height with the above-mentioned holes (6), such that the latter are covered at their greatest width, thus keeping the objects in the load from falling through said holes (6).

These plates (7) are attached by means of a hinged mounting. For this purpose, these plates (7) possess a laterally open, cylindrical structure (8) along one edge, so that this cylindrical structure (8) fits over a corresponding retaining rod (9) configured into the single-piece body of the cart.

The above-mentioned cylindrical structure (8) of the plates (7) is defined by a bevel (10) at the bottom, while the rods (9) for mounting these plates (7) are formed between a pair of tabs (11) and (12), so that the lower one (12) remains in an inclined position, preferably following the same inclination as that of the bevel (10) of the cylindrical structures (8) of the plates (7).

Figure 11:
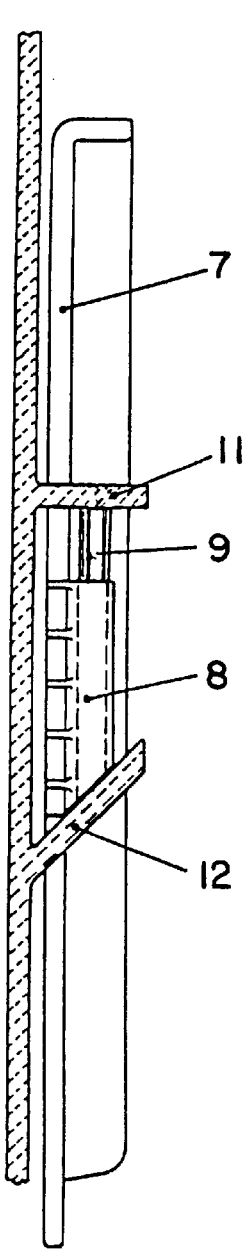
FIG. 11 is a view of the assembly of the plate of FIG. 8, in the stable position in which the holes of the application are closed.

In such conditions, said plates (7) tend to position themselves in the mounting in a stable situation determined by the coincidence of the slope of the bevel (10) of structures (8) with the lower inclined tab (12) of rods (9), as represented in FIG. 11. This arrangement has been provided so that the plates (7) will remain covering the holes (6), fulfilling their purpose, which is to keep products stored in the basket (1) from falling through the holes (6).

Figure 12:
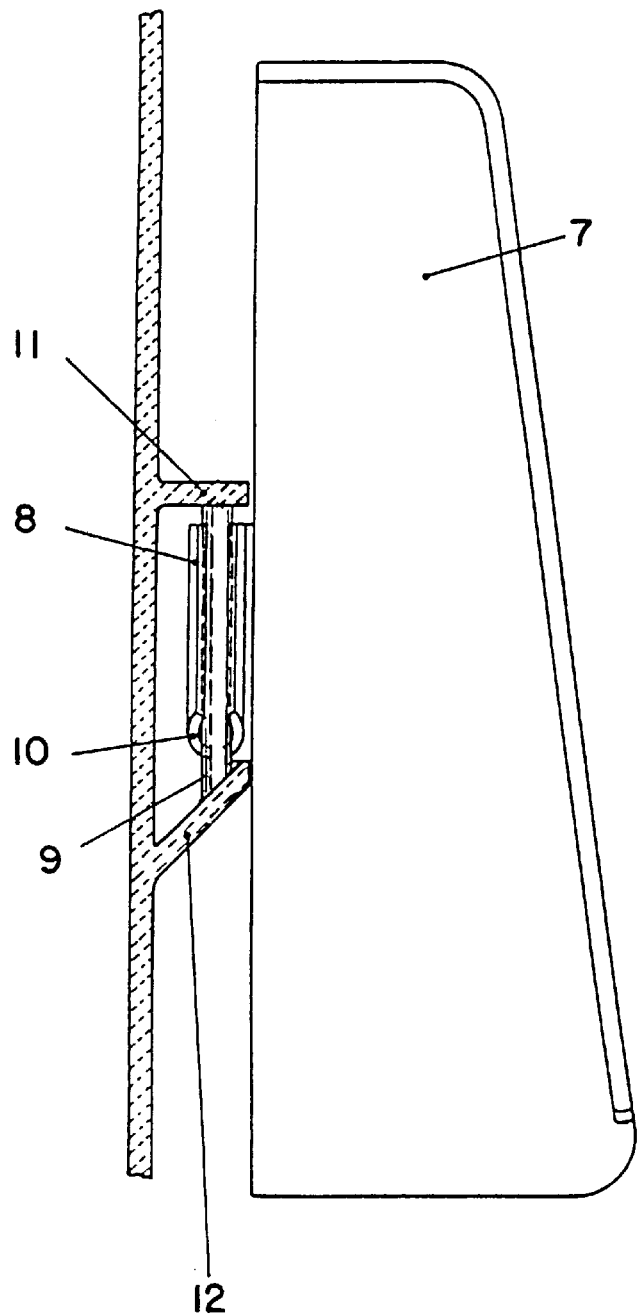
FIG. 12 is a view of the previous arrangement, with the plate folded to the side.

From that closed position, the above-mentioned plates (7) can swing toward the side walls of the basket (1), where they are out of the way so that they do not impede or hinder the insertion of cart baskets (1) into each other. They have the feature that, when these plates (7) are turned, they are forced upward due to the inclined planes of the bevel (10) and the tab (12) as may be seen in FIG. 12. The plates (7) are thus in an unstable position that makes said plates (7) tend to return automatically to the lower stable closed position when they are free.

In this manner, when the basket (1) of a cart is removed from inside the basket (1) of the cart in front, plates (7) automatically tend to return on their own to the closed position, thus ensuring that the holes (6) are covered.

The walls around the basket (1) along the sides and front are shaped with ribs (13) which protrude outward. Due to these ribs (13), the outside of the basket (1) is adequately durable. On the other hand, the walls have a smooth inner surface and an outside surface in relief defined by the crests of the ribs (13), which allows for recessed areas (14) for advertising signs. In this way, when one basket (1) is pushed into the basket (1) of another cart, the advertising signs are protected from chafing due to the fact that they are recessed relative to the outer plane defined by the ribs (13), while the inner surface of the walls is completely flat, allowing the insertion of one basket (1) into the basket (1) of the cart in front.

In each recessed advertising area (14) there is at least one opening (15) into the interior of the basket (1), through which it is possible to push outward the advertising signs that are in place using any piercing element, allowing the easy extraction of said signs for their removal.

The smooth interior surfaces of the basket (1) also permit the installation of advertising signs on the inside face of the front end wall, so that these will be within view of the person who is pushing the cart.

In the rear swinging wall (4) there is a child seat formed by two plates (17) and (18) connected to each other by a sliding coupler and both hinged on the above-mentioned wall (4), forming a set that folds and unfolds between the in-use and folded positions. One of the plates (17) is the base of the seat, while the other (18) is the back.

Figure 13:
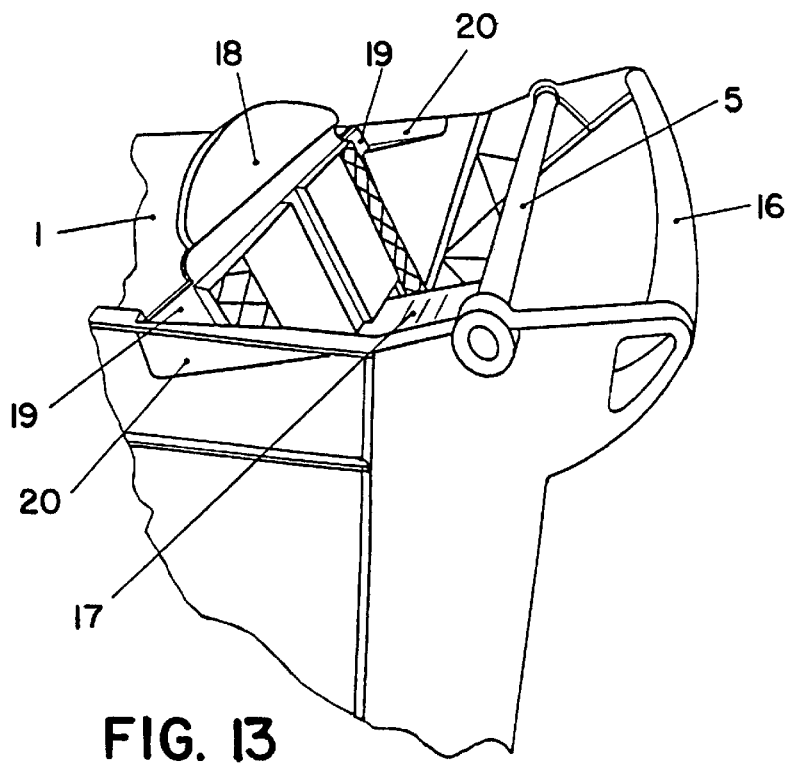
FIG. 13 shows a detail corresponding to a partial view of the top of the cart, where the stops on the sides for securing the back of the child seat may be observed in the unfolded position.

The above-mentioned back-rest plate (18) has side wings (19) at the top. These wings (19) correspond to step shaped grooves (20) formed by the inside of the side walls of the basket (1), creating stops that give firm support to the back (18), securing it in the unfolded position of the seat, and thus remaining stable in said position, as may be observed in FIG. 13.

Attachment of the wheels (3) onto the base (2) of the cart is accomplished by means of a coupler formed by a rod (21) with a widened head (22) at one end and threaded at the other to accept a nut (23). Said rod passes axially through a plastic-cylindrical sleeve (24) and through the corresponding support (25) of the respective wheel (3).

Figure 14:
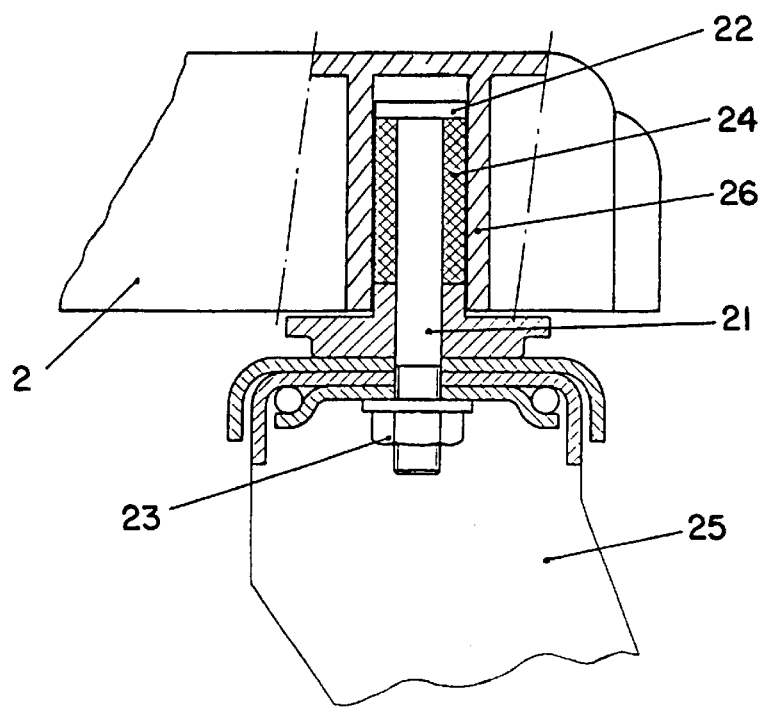
FIG. 14 is an enlargement of the mounting section of one of the cart wheels.

In this manner, in order to carry out the attachment of the wheels (3) to the base (2) of the cart, it is necessary only to introduce the set of sleeve (24) with the rod (21) placed axially through it into a housing (26) formed in the base (2), as shown in FIG. 14, so that, once introduced, the nut (23) is tightened. As the nut (23) is tightened, the rod (21) is pulled, causing the sleeve (24) to widen, pressing against the wall of the housing (26), which ensures that the wheel (3) is secure.

Disassembly is carried out with equal ease, as it is only necessary to loosen the nut (23), so that once the rod (21) stops exerting pressure on the elastic sleeve (24), the latter reassumes its original shape, no longer pressing against the housing wall (26). As a consequence, any of the wheels (3) of the cart may be easily replaced, when needed.

According to a unique feature of the invention, the base (2) is made with a rear extension (27) which extends beyond the rear vertical plane of the basket (1), the support wheels (3) of said rear part being attached to the above-mentioned extension (27) of the rear part. As a result, the longitudinal space between cart supports is increased, placing the center of gravity further away from said supports, which gives greater stability to the cart and reduces the risk of overturning caused by the pushing force on the handle (16) by the user of the cart, who often pushes downward, tending to make it tip over backward.

I claim:

1. A supermarket cart comprising:

a basket having side walls, a support base, support wheels mounted on the support base, the basket being provided with a swinging rear wall having sides and being hinged at the top, wherein located between the swinging rear wall and the side walls of the basket are plates located at a bottom portion of the basket, the plates covering holes at the sides of said swinging rear wall, and that these plates have a hinged mounting by means of a swiveling coupler comprising a cylindrical structure on each plate that is attached to an axle rod in the basket, the plates being capable of folding by swiveling, thus leaving the plates resting against the side walls of the basket.

2. A supermarket cart in accordance with claim 1, wherein the basket and the support base are made of a single plastic part, with outwardly protruding ribs around the outside of the side walls of the basket wherein an outer plane of the ribs extends beyond a main wall of the walls of the basket, thus creating recessed areas relative to said outer plane for including advertising signs; and wherein inner portions of the side walls of the basket are flat surfaces.

3. A supermarket cart in accordance with claim 1, wherein in the swinging rear wall of the basket there is a child seat formed by two plates coupled to each other and hinged to the swinging rear wall, so as to fold and unfold, one of the plates forming a back portion of the child seat, and being provided with side wings at the top of the plate wherein the side wings fit into grooves formed by the inside of the side walls of the basket, thus creating stops which secure the child seat in an open position.

4. A supermarket cart in accordance with claim 1, wherein the support wheels and the support base of the cart are connected by a coupling comprising a rod which passes axially through a plastic cylindrical sleeve, a nut screwed onto said rod, which pulls the rod when tightened, causing a sleeve to expand in width, thus exerting pressure the base, which fixes the support wheels in place.

5. A supermarket cart, in accordance with claim 1, wherein the support base of the cart has a rear extension extending beyond a vertical plane of a back part of the basket and rear wheels are attached to said extension wherein the rear wheels support a rear portion of the cart to avoid having the cart tip over backward.

6. A supermarket cart in accordance with claim 1, wherein the cylindrical structure on each plate creates an inclined bevel corresponding to the inclination of a lower tab against which an axle rod ends, so that the correspondence between inclined planes of the bevel and the lower tab causes the plates to move upward when the plates swivel from a closed position to a withdrawn position, in which each plate is pushed against an inner portion of the side walls of the basket and when the basket is removed from inside another cart, the inclined planes of the bevel causes each of the plates to swivel automatically from the withdrawn position to the closed position.

* * * * *